May 23, 1933. A. J. MUELLER 1,910,401
AUTOMOTIVE VEHICLE HEATER
Filed Feb. 8, 1932 2 Sheets-Sheet 1

Inventor
August J. Mueller
Lynn H. Latta
By
Attorney

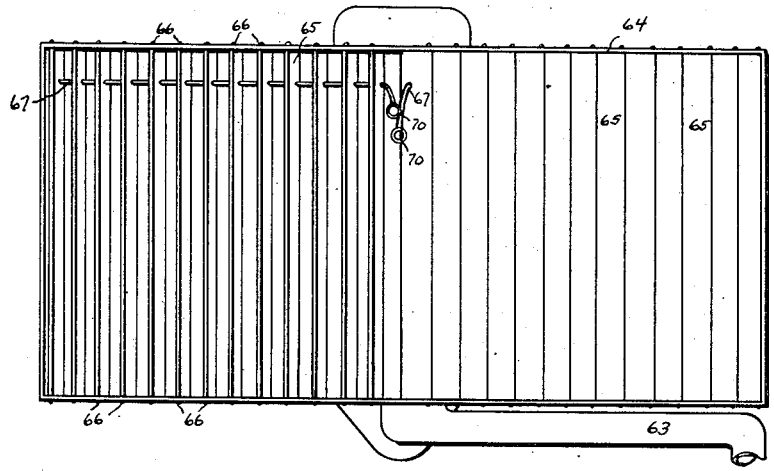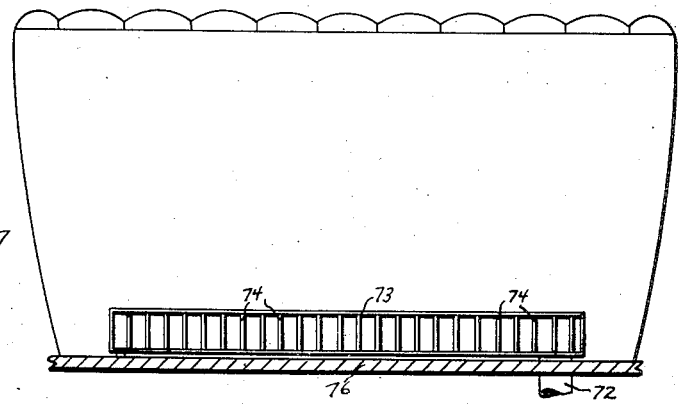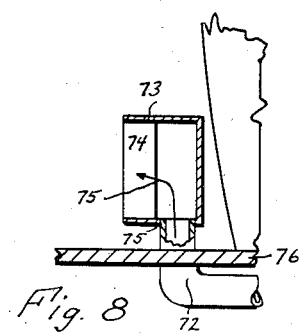

Patented May 23, 1933

1,910,401

UNITED STATES PATENT OFFICE

AUGUST J. MUELLER, OF YANKTON, SOUTH DAKOTA

AUTOMOTIVE VEHICLE HEATER

Application filed February 8, 1932. Serial No. 591,622.

My invention relates to an improved type of automotive heater over that type of which a patent was granted to me October 6, 1931, Patent No. 1,825,884.

My invention relates generally to automotive vehicle heaters of the hot water type and has for its general object to provide a heater of this type which is of simple construction and very efficient in operation.

A further object of my invention is to provide a heater adapted to be connected to a cooling system in an automobile and provided with means for diverting the flow of hot water to the heater or for shutting off the flow of hot water to the heater.

A further object of my invention is to provide a heater of this type which may be easily attached to the vehicle to which it is to be applied.

A further object of my invention is to provide an effective heating coil arrangement as a part of the heater.

A further object of my invention is to provide means for the heated air to circulate efficiently inside of the vehicle without the heat being concentrated at the feet of the persons in the front seat of the vehicle.

A further object of my invention is to provide a better circulating method than other heaters of this type, including my other patented heater.

A further object of my invention is to provide a more efficient blowing fan which will circulate the air outwardly as well as forwardly.

A further object of my invention is to provide for auxiliary means to heat the rear seat of an automobile when desired.

A further object of my invention is to provide attached means to the heater so only part of the hot air directed outwardly can be used if necessary.

A further object of my invention is to provide a heater which is of simple and durable construction and which can be manufactured at a reasonable cost.

Figure 1:
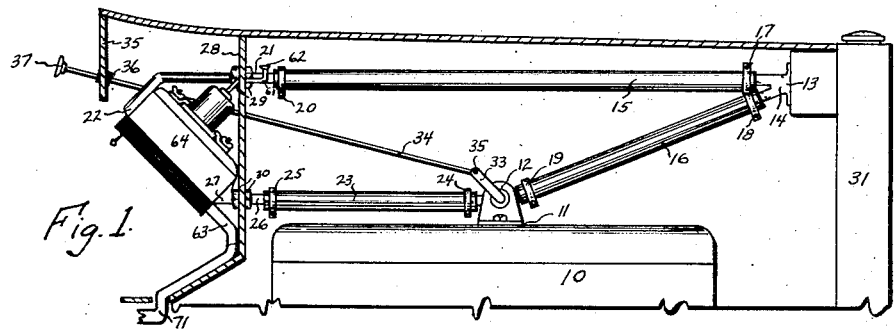
Figure 2:
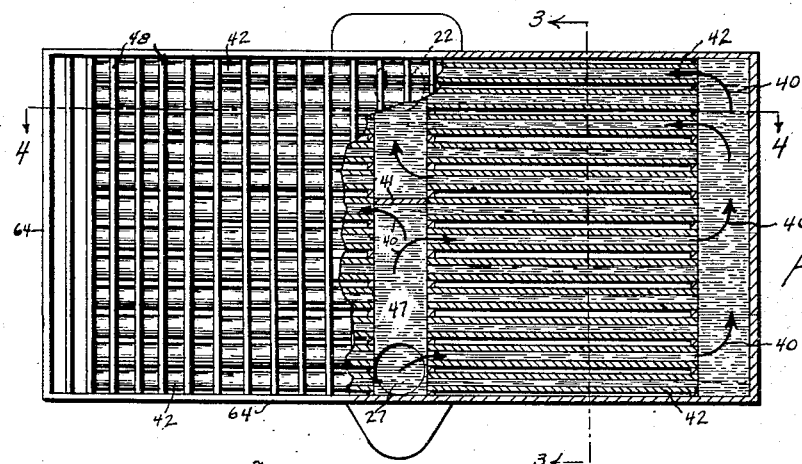
Figure 3:
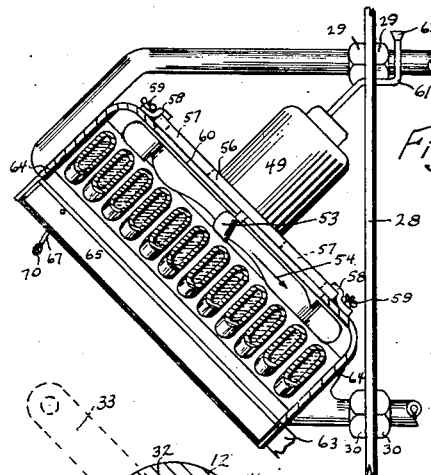
Figure 4:
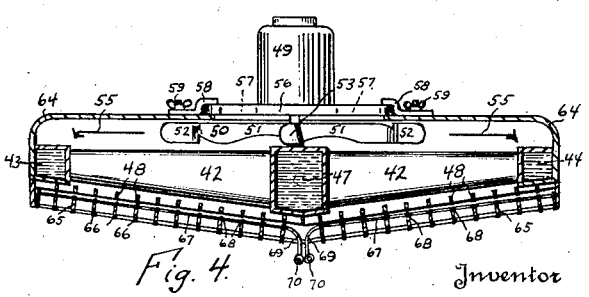
Figure 5:
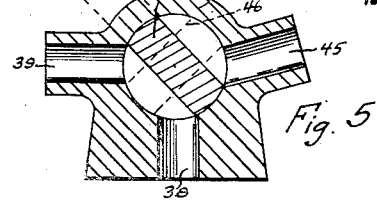

With these and other objects in view, my invention consists in the construction, arrangement, and combination of the various parts of my device whereby the objects contemplated are attained, as hereinafter more fully set forth, pointed out in my claims, and illustrated in the accompanying drawings, in which:

Figure 1 is a longitudinal sectional view of part of an automobile on which my heater is installed, Figure 2 is a rear elevation and sectional view of the radiator parts of the heater with the outside shutters removed, Figure 3 is a sectional view through the radiator taken along the lines 3—3 of Figure 2, Figure 4 is a sectional view of the heater taken along the lines 4—4 of Figure 2, Figure 5 is a schematic sectional view of the valve, Figure 6 is an elevation looking at the heater from the inside of the vehicle with the shutters attached, Figure 7 is a view of the auxiliary back seat heater in position in the rear of the front seat, and Figure 8 is an enlarged detail sectional view of this auxiliary heater.

I have used the reference character 10 to designate the water jacket of the automobile engine with the upper water jacket vent at 11.

The controlling valve housing is indicated by the character 12.

To the ordinary radiator connection at 13, I provide the Y connection 14 to which are clamped the two hoses 15 and 16 by means of the clamps 17 and 18. The lower part of the hose 16 is clamped to the valve housing 12 at 19, and the other end of the hose 15 is clamped at 20 to the upper tube 21, which terminates in the top of the heater at 22.

Another hose 23 is clamped at 24 to the valve housing 12 as shown. The other end of the hose 23 is clamped at 25 to the tube 26, which enters the lower part of the heater at 27.

The tubes 21 and 26 can be threaded so they can be secured to the front part of the vehicle 28 by means of the nuts 29 and 30. This will serve as a rigid supporting means for the heater or else it can be clamped to the dashboard or other adjacent parts by any method of clamping and so forth.

The usual radiator of the car is indicated by the character 31.

The valve 32, (see Figure 5), is controlled by means of the levered arm 33 attached thereto.

Attached to the arm 33 is the rod 34, which is attached to this arm by means of the bent portion at 35.

The rod 34 passes through the dash 35 at the point 36 and terminates in the button 37.

When the button 37 is pulled outwardly and is in the position as shown in Figure 1, the valve is in the position as shown in solid lines in Figure 5. When in this position, the hot water from the water jacket 10 passes upwardly through the opening 38 and thence through the opening 39 through the tube 23 and into the lower part of the heater and circulates through the heater as shown by the arrows 40.

Inside the heater I provide the plate 41, (see Figure 2), which insures a positive circulation of the liquid in the direction shown by the arrows; in other words, the hot water passes upwardly until it strikes the plate 41 and then passes outwardly through the tubes 42, which tubes are flattened as shown in Figure 3.

The liquid, after passing outwardly through these tubes, again passes upwardly through the end chambers 43 and 44, and the liquid is thence inflected inwardly again until it reaches the upper opening 22 and then it passes through the tube 15 into the radiator of the car again where it is pumped back into the water jacket in the usual manner.

Since the opening 45 is now closed, there will be no circulation in the tube or hose 16 and in this manner I get a circulation of hot water through the heater itself.

When it is desired to disconnect the heater, the button 37 is pressed inwardly towards the dash 35. This causes the valve 32 to be swung over to the position as shown in the dotted lines in Figure 5 at 46.

The openings 38 and 39 are then closed from the water jacket, and the hot water will then pass up through the opening 38, then through the opening 45 up through the hose 16 into the radiator 31 where it will be pumped back into the water jacket in the usual manner.

The liquid in the pipes 15 and 23 will be comparatively stagnant and there will be no circulation through the heater.

The shape of the tubes 42 in the heater are more clearly shown in Figure 4 and tend to converge at their outer extremities where they terminate in the vertical end chambers 42 and 44.

The central vertical chamber is indicated by the character 47. I construct the tubes in this manner so that when the air passes from the fan through these tubes, it will be blown in a direction outwardly from the center of the automobile and will then tend to pass outwardly and around the car so as to allow for more efficient circulation of the warm air.

I provide the fins 48 to help guide the streams of warmed air in this direction.

For forcing the air outwardly between these tubes, I provide the blower 49 which is an ordinary type of electric blower motor.

In order to promote a more efficient forced draft, however, I use the specially constructed fan 50. The lower portions 51 of the fan are made according to the usual type, but the outer portions 52, however, are bent backwardly slightly as shown at 53.

When the fan rotates in the direction as shown by the arrow 54 in Figure 3, or in other words a counter clockwise direction, it will be seen that by virtue of the shape of the end members 52, the air currents will follow approximately the directions as indicated by the arrows 55 so that there will be air currents passing between the tubes 42 in a direction parallel to the shaft of the blower and also outwardly as explained.

In this manner the air currents will completely fill the entire space of the tubing and will provide a more efficient circulation.

The motor 49 includes the flange 56, which flange also includes the openings 57 which are provided to allow an inlet for the air.

The blower is attached to the casing of the heater by means of the brackets 58, which are secured by the thumb nuts 59.

An opening 60 is provided in the casing to allow insertion of the fan.

(See Figure 3) when it is desired to remove the entire fan, the brackets 58 can be swung to one side and by manipulating the fan blade properly, it can be removed from the opening 60.

I further provide the pipe 61 with the small funnel 62 so that the blower motor can be oiled from the inside of the hood of the automobile.

To heat the rear seat of the car I provide an additional pipe 63, which passes up into an extension of the casing of the heater 64.

When the front seat of the car has been warmed sufficiently I merely close the shutters 65, which are pivoted at the point 66 to the upper parts of the frame. I close the shutters by means of the flexible inwardly extending rods 67 which are pivoted at 68 to the inside of the shutters. These rods are made of comparatively thin wire and are bent at 69 and terminate in the loops 70 so they can be grasped and when the loops 70 are pulled outwardly, the shutters 65 will be closed and when the loops are pushed inwardly the shutters will be opened, and in this manner either side of the heater can be closed or opened.

When these shutters are closed the greater part of the heat will pass through the pipe 63, which passes down through the floor board of the car at 71 and again upwardly behind the rear seat at 72.

This pipe then terminates in the rear heater 73, which is merely a rectangular metal housing which includes the fins 74.

The pipe 72 terminates inside of this housing at 75.

It will be seen that from this construction that by closing the shutters, all of the heat will pass through the pipe 63 and thence towards the back seat as indicated by the arrow 75.

The floor of the car is indicated by the character 76.

It will be further seen that the shutters can be controlled at will so that the temperature can be more equally adjusted.

It will be seen that I have provided a heater of simple construction which can be readily attached to the cooling system of an automobile and which will provide an efficient circulation from the cooling system.

It will be seen further that I have provided such a heater which has a comparatively effective heating coil arrangement.

It will be seen further that I have provided a heater which insures a positive circulation of warm air, which circulation will be directed outwardly and around the inside of the car so that it will function in the most healthful manner.

It will be seen furthermore that I have provided more efficient blowing arrangement as well as additional means to warm the rear seat of an automobile.

It will be seen further that I have provided a heater which can be controlled readily from the front seat.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In an automotive vehicle heater, a casing, a plurality of horizontally flattened tubes arranged in vertical relation within the casing, a water inlet at the bottom of the casing, a water outlet at the top of the casing, and means for causing a positive circulation of water from the inlet thence outwardly through the tubes and thence through the outlet, said means comprising a vertical chamber positioned in the center of the casing, and vertical outer chambers arranged at the extremities of the tubes, and a partition positioned midway of the central vertical chamber, the tubes connecting the central and outer chambers, and means for forcing air between the tubes.

2. In an automotive vehicle heater, a casing, a plurality of horizontally flattened tubes arranged in vertical relation within the casing, a water inlet at the bottom of the casing, a water outlet at the top of the casing, and means for causing a positive circulation of water from the inlet thence outwardly through the tubes and thence through the outlet, said means comprising a vertical chamber positioned in the center of the casing, and vertical outer chambers arranged at the extremities of the tubes, and a partition positioned midway of the central vertical chamber, the tubes connecting the central and outer chambers, and means for forcing air between the tubes, said means comprising a driven fan including integral backwardly bent blade extensions.

3. In an automotive vehicle heater, a casing, a plurality of horizontally flattened tubes arranged in spaced relation within the casing, a central vertical chamber, and a pair of vertical chambers at the extremities of the tubes connected by the tubes with said central chamber, means for blowing air through the spaces between the tubes, and shuttered means for controlling the output of heated air.

4. In an automotive vehicle heater, a casing, a plurality of horizontally flattened tubes arranged in spaced relation within the casing, a central vertical chamber, and a pair of vertical chambers at the extremities of the tubes connected by the tubes, means for blowing air through the spaces between the tubes, and shuttered means for controlling the output of heated air, said means comprising a plurality of long and narrow shutters, pivoted at their outer edges to the upper and lower parts of the casing, and a pair of wires successively pivoted at their inner edges to allow opening and closing movement of the shutters.

5. In an automotive vehicle heater, a casing, a plurality of horizontally flattened tubes arranged within the casing, and means forcing air through the tubes comprising a driven fan including integral backwardly bent blade extensions, said tubes converging at their outer extremities and toward the continuous flat plane of their rear edges and a plurality of fins positioned at right angles to the plane of the convergent edges of the tubes and pivoted within and to the casing, to allow a divergent circulation of heated air through them.

6. In an automotive vehicle heater, a casing, a plurality of horizontally flattened tubes arranged within the casing, and means forcing air through the tubes comprising a driven fan including integral backwardly bent blade extensions, said tubes converging at their outer extremities and toward the continuous flat plane of their rear edges and a plurality of fins positioned at right angles to the plane of the convergent edges of the tubes, to allow a divergent circulation of heated air through them, and a plurality of shutters pivotally secured to the upper and lower portions of the casing for regulating the output of heated air.

7. In an automotive vehicle heater, a casing, a plurality of horizontally flattened tubes arranged within the casing, and means forcing air through the tubes comprising a driven fan including integral backwardly bent blade extensions, said tubes converging at their outer extremities and toward the continuous flat plane of their rear edges and a plurality of fins positioned at right angles to the plane of the convergent edges of the tubes, to allow a divergent circulation of heated air through them, and a plurality of shutters pivotally secured to the upper and lower portions of the casing for regulating the output of heated air, and means for heating the rear seat of the vehicle attached to the lower side of the casing and within the shutters, comprising a pipe attached thereto, and a rear seat outlet attached to the outer end of the pipe.

8. In an automotive vehicle heater, a casing, a plurality of horizontally flattened tubes arranged in vertical relation within the casing, a water inlet at the bottom of the casing, a water outlet at the top of the casing, and means for causing a positive circulation of water from the inlet thence outwardly through the tubes and thence through the outlet, said means comprising a vertical chamber positioned in the center of the casing, and vertical outer chambers arranged at the extremities of the tubes, and a partition positioned midway of the central vertical chamber, the tubes connecting the central and outer chambers, said casing being positioned beneath the dashboard of the vehicle and facing at an angle downwardly from the vertical.

Signed at Sioux City, Ia., this 11th day of January, 1932.

AUGUST J. MUELLER.